Sept. 10, 1929.   H. A. AFFEL   1,727,328
HIGH FREQUENCY MEASURING SYSTEM
Original Filed Nov. 21, 1924
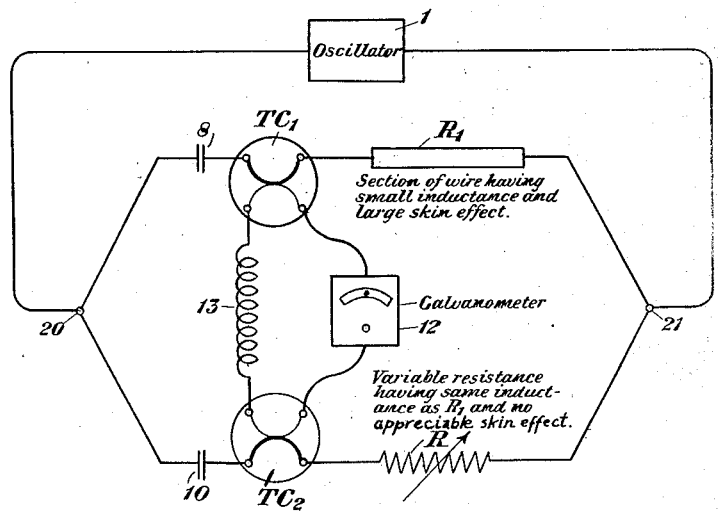
INVENTOR.
H. A. Affel
BY
ATTORNEY Patented Sept. 10, 1929.

1,727,328

UNITED STATES PATENT OFFICE.

HERMAN A. AFFEL, OF RIDGEWOOD, NEW JERSEY, ASSIGNOR TO AMERICAN TELEPHONE AND TELEGRAPH COMPANY, A CORPORATION OF NEW YORK.

HIGH-FREQUENCY MEASURING SYSTEM.

Original application filed November 21, 1924, Serial No. 751,406. Divided and this application filed September 17, 1927. Serial No. 220,236.

This invention relates to high frequency measuring systems and particularly to means for measuring the impedance of a circuit at high frequencies.

This is a division of the applicant's copending application, Serial No. 751,406, filed November 21, 1924.

As is well known to those familiar with the art, apparatus which is entirely satisfactory for the measurement of low frequency currents proves inadequate when high frequency currents are to be measured. One of the objects of the present invention is to measure high frequency currents and potentials, the method for doing which consists in balancing an unknown direct current potential by a known potential, the direct current potential being produced by rectification or other method of conversion of unknown and known currents respectively, of frequencies at which it is desired to measure. By translating the alternating currents into proportional direct current potentials and by opposing these potentials in a circuit having a center zero galvanometer, a visual indication of the balance of the high frequency currents is thereby afforded, and it is possible to eliminate serious errors in the testing apparatus heretofore used for the measurement directly of high frequency currents.

The use of this invention to determine the magnitude of an unknown impedance for high frequency currents is disclosed in my copending application, Serial No. 220,235, filed September 17, 1927. The object of the invention herein disclosed and claimed is to determine the frequency of a current by utilizing the general principles set forth hereinbefore.

This invention will be clearly understood from the following description when read in connection with the attached drawing, which represents a frequency meter based upon the principle underlying the impedance measurement systems.

The arrangement shown in the drawing which embodies the same principle that underlies the arrangements in the copending application, Serial No. 220,235, filed Sept. 17, 1927, is adapted to determine the frequency of the current applied to the network shown in the drawing. The oscillator 1 is connected across the terminals 20 and 21 of the network, which consists of two branches, one of which includes the thermocouple $TC_1$ and the resistance $R_1$, and the other the thermocouple $TC_2$ and the resistance R. The resistance $R_1$ is preferably a section of wire having a very small inductance and a large variation in resistance with frequency which is known in the art as "skin" effect. The element R is a variable resistance with an inductance of the same amount as is contained in the element $R_1$. To minimize the skin effect of R, non-magnetic wire of very small diameter should be employed. The condensers 8 and 10 serve to keep the direct currents out of the high frequency paths. The direct current sides of the thermocouples are connected with a circuit containing the galvanometer 12 and an inductance 13.

In order to utilize the arrangement shown for frequency measurement, current of a known frequency from a source 1 is connected across the terminals 20 and 21 and the resistance element R is varied until the galvanometer needle rests upon its center zero point, which indicates equality of the direct current potentials and likewise of the highfrequency currents flowing through the two branches of the network. The setting of the dial of the resistance element R is a measurement of the frequency of the current applied by the oscillator 1. If current of another frequency is caused to flow through the network from the source 1, the resistance element R requires further adjustment in order to effect a balance of the direct current potentials. In this manner the network may be calibrated for a range of frequencies and as thus calibrated it provides a simple and effective frequency meter.

It will be seen that by means of the arrangement shown and described herein, the frequency of a current, even though it may be high in the frequency scale, may be measured with greater accuracy than possible heretofore by virtue of the translation of the high frequency currents into equivalent direct current potentials by suitable devices before measurement. While only the thermocouple has been shown for this purpose it is to be understood that any equivalent means for carrying out the principle of translation may also be used.

While this invention has been disclosed as embodied in particular forms it is to be understood that it is capable of embodiment in other forms without departing from the spirit and scope of the appended claims.

What is claimed is:

1. In a frequency measuring device, the combination with a source of current, the frequency of which is to be measured, of a network connected in series therewith having two parallel branches, one including a resistance having large skin effect, the other including a resistance having no appreciable skin effect, means connected with each branch to convert the alternating current in the branch into equivalent direct current potentials and an indicating device differentially connected with said converting means so that the direct current potentials will be opposed in said indicating device.

2. In a frequency measuring device, the combination with a source of current, the frequency of which is to be measured, of a network connected in series therewith having two parallel branches, one including a resistance having large skin effect, the other including a variable resistance having no appreciable skin effect and calibrated for a range of frequencies, means connected with each branch to convert the alternating current in the branch into equivalent direct current potentials and an indicating device differentially connected with said converting means so that the direct current potentials will be opposed in said indicating device.

3. In a frequency measuring device, the combination with a source of current, the frequency of which is to be determined, of a network connected in series with the said source and comprising two parallel paths and a shunt path, one of said parallel paths including the heating element of a thermocouple in series with a resistance having small inductance and large skin effect, the other parallel path including the heating element of another thermocouple in series with another resistance variable at will and having substantially the same inductance as the first mentioned resistance and no appreciable skin effect, the said shunt path having an indicating device differentially connected with the direct current terminals of said thermocouples to oppose their effects upon said indicating device.

4. In a frequency measuring device, the combination with a source of current, the frequency of which is to be determined, of a network connected in series with the said source and comprising two parallel paths and a shunt path, one parallel path including in series, a resistance of small inductance and large skin effect, the heating element of a thermocouple and a condenser, the other parallel path including in series, a resistance, variable at will, having the same inductance, as the first mentioned resistance and no appreciable skin effect, the heating element of another thermocouple and another condenser, and the shunt path including an indicating device in series with a choke coil, the said indicating device being differentially connected with the direct current terminals of said thermocouples to oppose their effects on said device.

In testimony whereof, I have signed my name to this specification this 15th day of September, 1927.

HERMAN A. AFFEL.